Jan. 29, 1935. G. E. MARKLEY 1,989,172
APPARATUS FOR ELECTRIC WELDING
Filed June 11, 1930   2 Sheets-Sheet 1
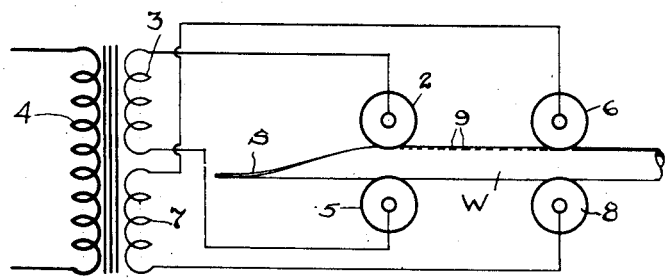
Fig. 1
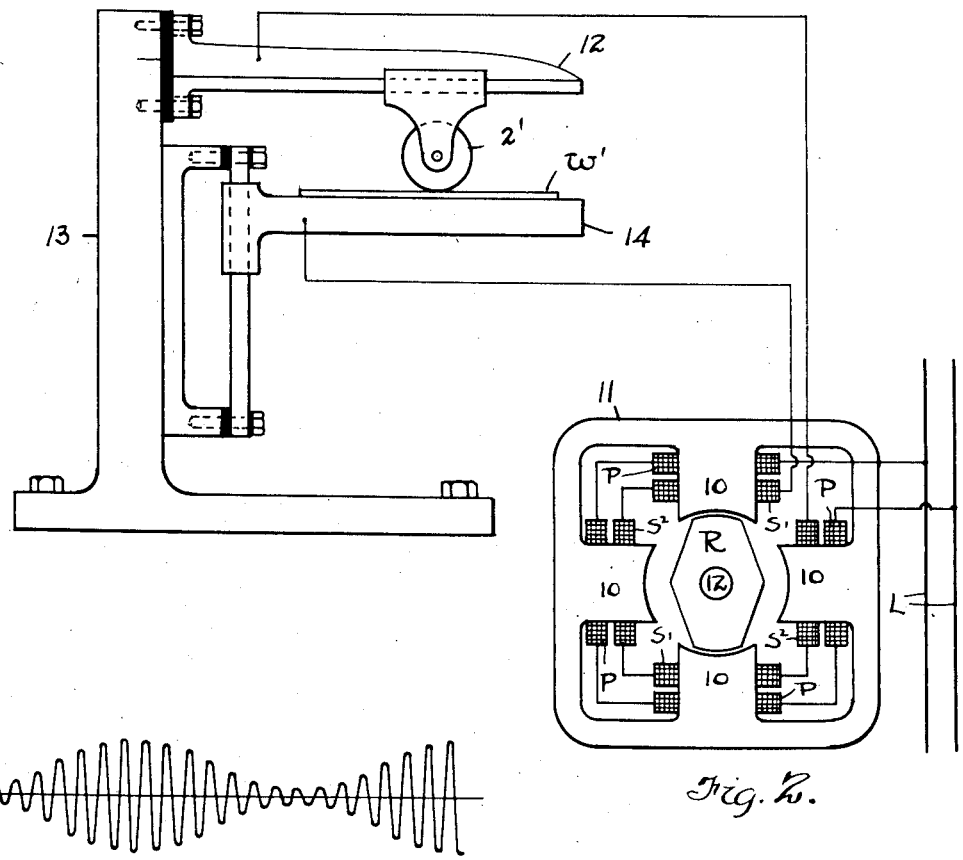
Fig. 2
Fig. 3
INVENTOR.
George E. Markley
BY
Fay, Oberlin + Fay
ATTORNEYS.

Jan. 29, 1935.  G. E. MARKLEY  1,989,172
APPARATUS FOR ELECTRIC WELDING
Filed June 11, 1930   2 Sheets-Sheet 2

INVENTOR.
George E. Markley
BY
Fay, Oberlin & Fay
ATTORNEYS

Patented Jan. 29, 1935

1,989,172

UNITED STATES PATENT OFFICE 1,989,172

APPARATUS FOR ELECTRIC WELDING

George E. Markley, Cleveland Heights, Ohio

Application June 11, 1930, Serial No. 460,418

7 Claims. (Cl. 219—4)

In the practice of electric welding, it has generally been customary to seam by passing an electrode along the metal edges to be seamed, or conversely by feeding the work under the electrode, while supplying the welding current interrupted by a make and break device such as to provide current flow at spaced intervals along the seam. Such interruption of heavy currents required in welding offers much difficulty, the make and break contacts quickly burning out, besides being wasteful in operation.

In accordance with the present invention however, it is possible to avoid such difficulties, and welding may be had without the fundamental handicap of having to break the current, and at the same time, superior results may be had in seaming.

To the accomplishment of the foregoing and related ends, the invention, then, consists of the features hereinafter fully described, and particularly pointed out in the claims, the following description and the annexed drawings setting forth in detail certain embodiments of the invention, these being illustrative however of but a few of the various ways in which the principle of the invention may be employed.

In said annexed drawings:—

Figure 4:
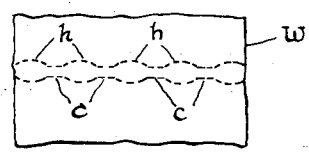
Figure 5:
Figure 6:
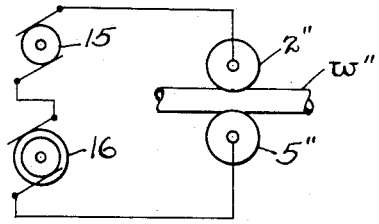
Figure 7:
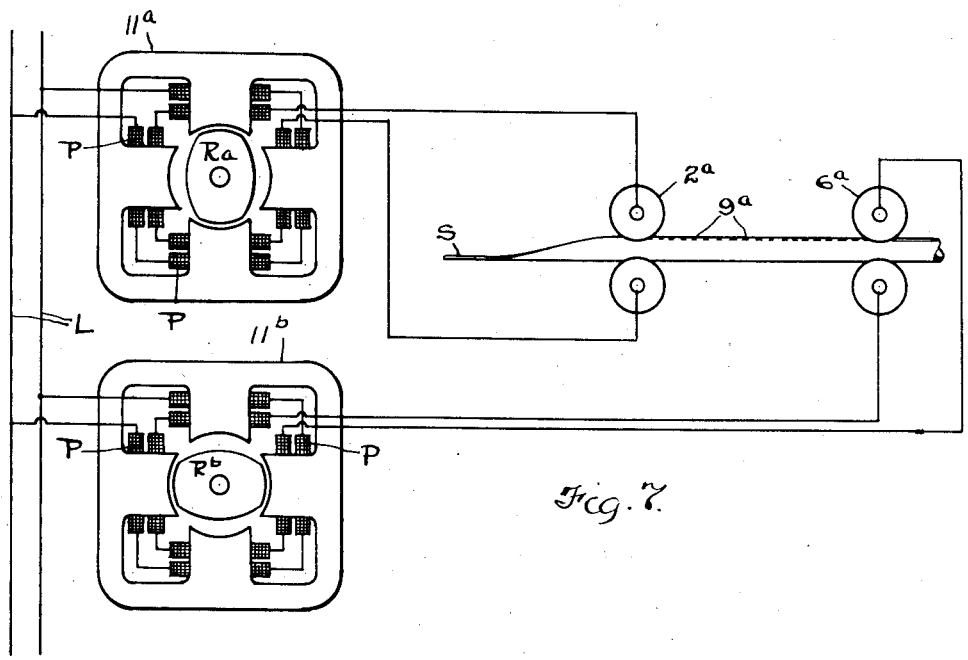

Fig. 1 is a diagrammatic elevational view of apparatus contemplated in the invention; Fig. 2 is a similar view of another form; Fig. 3 is a graphic representation of one form of undulatory current applicable in the process; Fig. 4 indicates schematically the action of such type of current in continuous weld action; Fig. 5 is a representation of another form of undulatory current; and Figs. 6 and 7 are diagrammatic views of other apparatus arrangements.

In its general aspects the invention contemplates welding by undulatory heating-current application without breaking the circuit and such as to especially heat and soften spaced-apart points along a seam, (the initially cooler intermediate points acting to limit the crowding together of the seam edges and thus checking flash-over or finning), and supplying current to the said intermediate points for controlled welding also thereat.

Referring to Fig. 1, there is shown an electrode 2, preferably in the form of an electrode roll, connected to the secondary winding 3 of a transformer having a primary winding 4 supplied from a single phase line. The circuit of the secondary winding 3 is completed through the work W by suitable means, for instance a roller 5. While seaming may be carried on with different forms of work pieces, for convenience it is here illustrated as applied to a tube which is shaped up from sheet stock $s$, and the edges brought together in a manner well known in the art. Another electrode 6 is connected with a secondary winding 7 of the transformer, the circuit being completed through the work by a contact element 8.

With relative movement provided between the work and the electrodes, either the electrodes being moved along the work, or the work piece being moved under the electrodes, as most convenient in any particular instance, a welding current of alternating or pulsating or fluctuating character is supplied from the winding 3 to the electrode 2 and the work while the relative movement and the current flow are so correlated that a series of softened points 9 are produced under the electrode as the seam passes along, and these under the pressure to which the seam is held form spaced welds.

On coming under the successive electrode 6, current is had from the winding 7, and the correlation is so adjusted that the current flow at this location occurs at the intermediate points between the spaced welds produced by the first electrode 2, thereby completing the weld areas and forming a seam welded throughout.

By having such arrangement of successive electrodes and separate windings for their respective current supply, I am enabled furthermore to adjust the windings to gauge the current for the particular requirements of each electrode. For instance, where a seam has already been partly made by the first electrode, the resistance encountered under a successive electrode is different from that initially encountered, and the winding for the supply of such electrode may accordingly be thus adapted to the conditions encountered.

In the form of the invention shown in Fig. 2, an electrode 2' is arranged on the work W', and receives current from secondary windings $S_1$, $S_2$, $S_1$, $S_2$, which may be connected in series, and arranged preferably on pole pieces 10 of a stator 11. Primary windings P, conveniently arranged adjacent the secondaries, are connected in series with line L supplying a pulsating or fluctuating or alternating current, single phase or polyphase. Means is provided to periodically shift the magnetic flux into a metallic shunt path, and the latter may take the form of a rotor R having diametral portions sweeping close to the pole pieces. The shaft 12 of the rotor is driven by any suitable means, for instance a motor. For work on barrels and articles of definite length, conveniently the electrode roll 2' may be carried by a support 12 insulatively mounted on a frame 13, and the work may be supported on a work-holder 14 adjustable as to height. Relative movement may be had by moving the electrode or by moving the work, as may be preferred.

With a fluctuating or pulsiform or alternating current, for instance a single phase or polyphase current from the line L through the primary windings P and a relative movement provided by the driving of the rotor R at a rate greater or less than synchronism with the primary current, there will be induced in the secondary-windings waves timed generally to those in the primary but there will be a periodic diminution in amplitude or a modulation thereof as the magnetic flux is varied by periodic diversion through the metallic shunt path offered by the rotor R. In some instances, it may be more convenient to revolve the windings and maintain the metallic shunt path stationary. However accomplished, a current supply having periodic increase and decrease is had and for instance with a 60 cycle feed to the primaries and a subsynchronous driving rate of the machine, a current having a wave form is had somewhat as illustrated in Fig. 3, in which the amplitude swing of alternating form is periodically reduced to a very low minimum. By suitable proportioning of the secondary windings $S_2$ with respect to the windings $S_1$, the extent of the diminution toward or to zero may be governed, and this constitutes a highly important advantage of this form of device. For instance, with some classes of work, where relatively little cooling between softened weld points is desirable, the proportioning of the respective sets of secondary windings may be readily made such as to yield a wave form in which the diminution of amplitude toward zero is correspondingly slight. On the other hand, where greater cooling is desired between hot-points along the seam, the secondary windings $S_2$ may be proportioned still smaller such as to diminish the current nearly to or even substantially to zero.

With relative movement provided between the work piece W', and the electrode 2', a spaced series of thoroughly softened weld points is had, and the intermediate points being cooler do not yield under the seam-compression, and thus they prevent excessive crowding together and resultant overflowage into a flash or fin, although they are sufficiently heated to allow enough cohering to close and complete the seam. This action is exaggeratedly indicated in Fig. 4, in which a portion of the work W' is shown on magnified scale, and the points $h$ represent the points along the seam which are well softened, while the intermediate points $c$ represent the cooler points which resist deformative compression and flash-over and which barely cohere.

In some cases, the welding electrode may be supplied by a current from a generator instead of from a transformer type of device. Such generator may be one of various forms providing currents of modulated undulatory character. For instance, an inductor-alternator may be employed, and a current of wave-form somewhat as in Fig. 5. A similar result can be accomplished by running rotor R of Fig. 2 at supersynchronous speed. Again, in some cases, an undulatory current derived from superposing a direct current and an alternating current may be employed. As illustrated in Fig. 6, a circuit having a D. C. generator 15 and an A. C. generator 16 in series may supply the electrode 2''.

In the arrangement shown in Fig. 7, a succession of electrodes $2a$, $6a$, is shown, each supplied by current from secondary windings of the respective machines $11a$, $11b$, whose primaries are connected to the single phase A. C. line L. By correlating the drives of the respective machines and the work movement, the first electrode may provide weld spots $9a$, and the successive electrode may finish up the intermediate points, heating them thus to the same extent as the initial spots $9a$. Such procedure provides a thoroughly uniform weld seam, but with the same advantages again that intermediate cooler points prevent flash overflow.

By adjusting the rate of motion and the wave rate, it will thus be seen that the softened spots along the seam may be provided as may be desired, and withal it becomes possible to attain a good union without deformation, since the cooler points intervening between the softened points afford a limitation upon the extent to which pressure may cause flowage or finning of the metal at the seam; and with the successive application of further electrodes, all of the metal throughout the seam may be in succession brought to a weld without surplus flowage.

Welding in the form of butt-seaming or lap-seaming can thus be readily accomplished in accordance with the invention, and various kinds of work may be handled, whether flat or tubular, and the process is particularly well adapted to the production of tubes, as well as cans, barrels, etc. Where the rotor-stator type of current-supply device is employed, and with successive electrodes along the work, a common mounting for the rotors may be had, where preferred, one drive shaft carrying all the moving parts, including the motor-driver.

Other modes of applying the principle of the invention may be employed, change being made as regards the details described, provided the features stated in any of the following claims, or the equivalent of such, be employed.

I therefore particularly point out and distinctly claim as my invention:—

1. Apparatus for electric welding, which comprises a work support, electrodes at successive positions therealong, and means for current supply to such respective electrodes, including a separate secondary winding in circuit with each electrode, and a primary winding inductively coupled to each said secondary winding and supplied by an alternating current, and a rotor turning in relation for periodically shifting the magnetic flux successively in said secondary winding.

2. Apparatus for electric welding, which comprises a work support, an electrode, and a means for current supply thereto including a primary winding adapted to be supplied by alternating current, a secondary winding in circuit with the electrode and constantly inductively coupled to said primary winding, and a rotor for periodically directing the primary magnetic field away from the secondary winding.

3. Apparatus for electric welding, which comprises a work support, an electrode, and means for current supply thereto including a stationary primary winding connecting with a source of alternating current, a stationary secondary winding in circuit with the electrode and inductively coupled to said primary winding, a rotor revolving past said secondary winding and carrying a metallic shunt path for the magnetic flux, and means for revolving the rotor.

4. Apparatus for electric welding, which comprises a work support, an electrode, and means for current supply thereto including a secondary winding in circuit with the electrode, a primary winding also in circuit with a source of alternating current and inductively coupled to said secondary winding, both said windings being on a common pole piece, and a rotor providing a moving shunt path of low reluctance for magnetic flux in its revolution past such pole piece.

5. Apparatus for electric welding, which comprises a work support, an electrode, and means for current supply thereto, including stationary secondary windings all connected in series to the electrode, primary windings adjacent and inductively coupled to said secondary windings and connected in series to a source of alternating current, and rotor means for periodically directing the magnetic field away from the secondary windings.

6. Apparatus for electric welding, which comprises a work support, electrodes spaced therealong, and means for current supply to the respective electrodes, including a separate set of secondary windings in series-connection with each electrode, a set of primary windings inductively coupled to each set of said secondary windings and connected in series to a source of alternating current, and a rotor for revolving past each set of secondary windings and periodically providing metallic shunt paths for the magnetic flux, said rotors being at angles to each other.

7. Apparatus for electric welding, which comprises a work support, electrodes spaced therealong, and means for current supply to the respective electrodes, including a stator and a rotor for each, pole pieces on said stators, primary windings thereon connected in series to a source of alternating current, secondary windings on said stators and inductively coupled with said primary windings and each stator set thereof connected in series with a respective electrode, and a shunt path of low reluctance for magnetic flux carried by each rotor, said rotors being at angles to each other.

GEORGE E. MARKLEY.